United States Patent Office 2,720,868
Patented Oct. 18, 1955

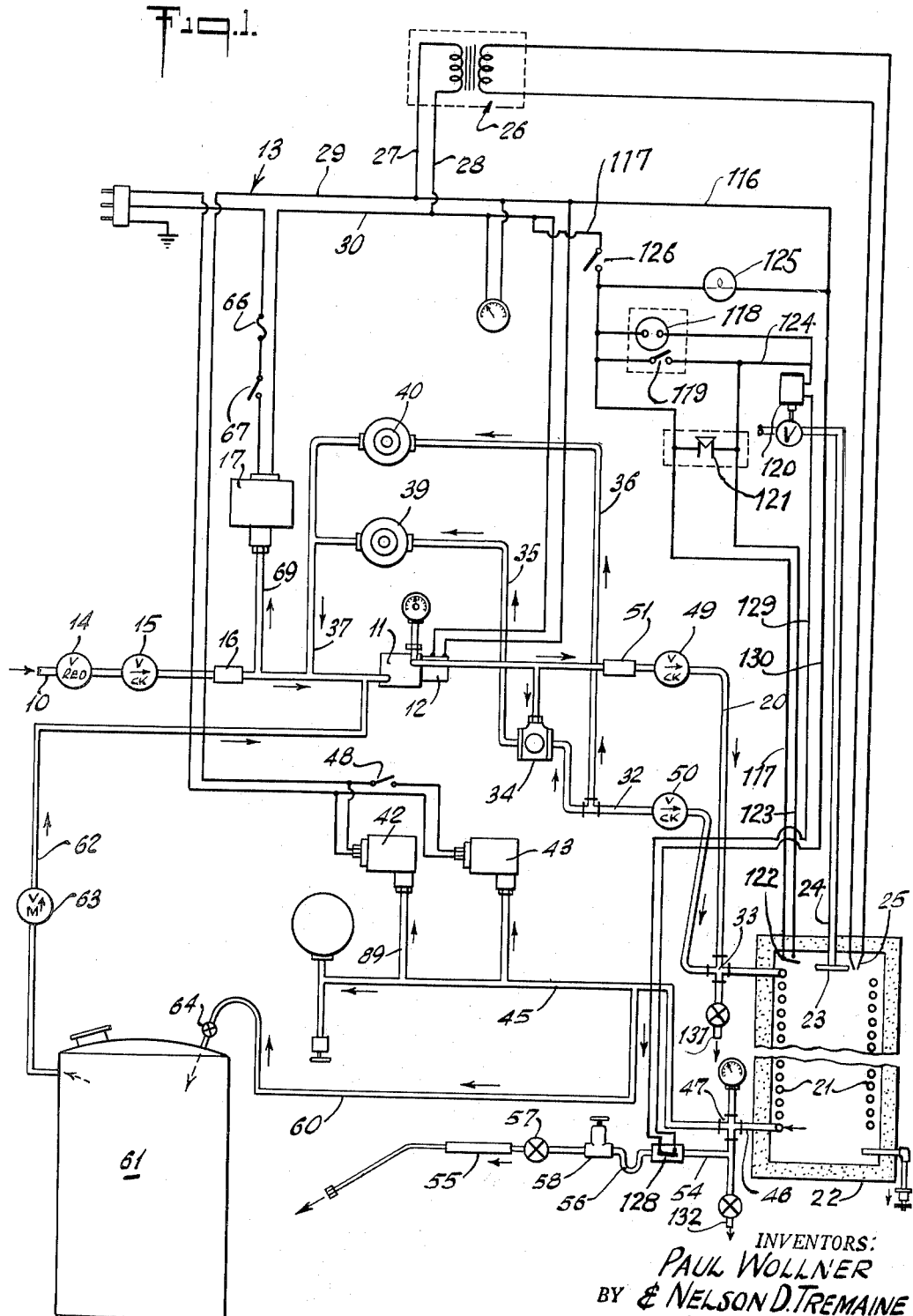

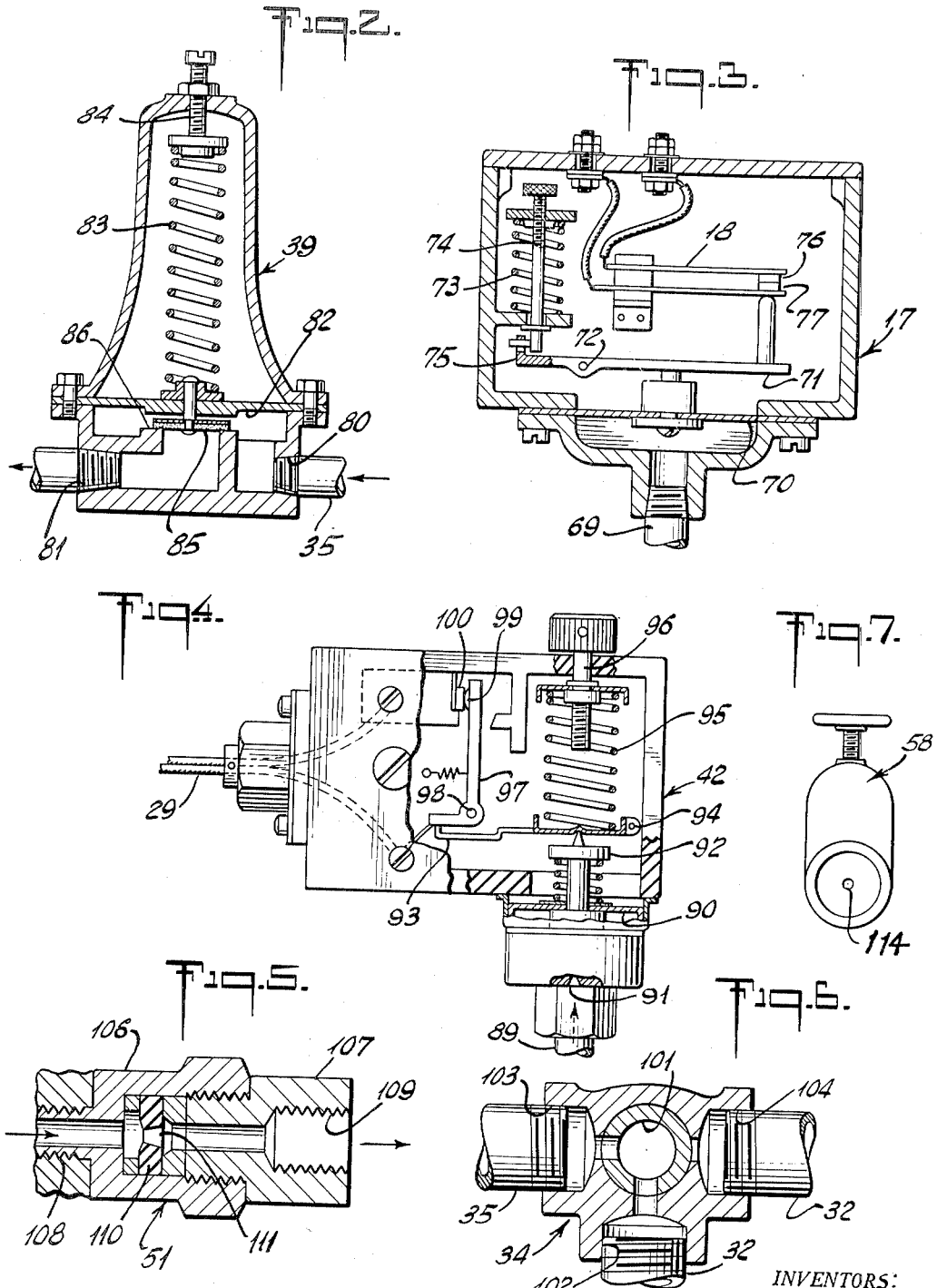

2,720,868

AUTOMATICALLY CONTROLLED WATER SUPPLY SYSTEM FOR CLEANING MACHINES

Paul Wollner, Weehawken, N. J., and Nelson D. Tremaine, New York, N. Y., assignors to Aeroil Products Co. Inc., South Hackensack, N. J., a corporation of New Jersey Application July 21, 1952, Serial No. 299,936

5 Claims. (Cl. 122—448)

This invention relates to a machine for cleaning articles such as airplanes, automobiles, tractors, tanks and the like by projecting a stream thereagainst of hot or cold water or steam, and the invention has for an object to provide an automatically controlled water supply system by means of which water is heated in a continuous flowing stream under the desired pressure and projected through a nozzle in the form of hot water, a spray, steam, or rinse water.

Another object of the invention is to provide a system of said character including means to automatically provide the required pressure and quantity of flow of water in a stream through a heater for the discharge of hot water or steam at the required temperature and pressure.

Still another object of the invention is to provide means for maintaining the flow of water in the system at a predetermined pressure and quantity for the discharge of hot water and at a predetermined pressure and quantity for the discharge of steam.

Still another object of the invention is to provide means in said system for discharging hot or cold water or steam by the manipulation of a minimum number of controls.

Still another object of the invention is to provide pump means for producing the pressure of the water in the system, and electrical means for controlling the flow of fuel oil for heating the water and for discontinuing the flow of the fuel oil in the event that the water flowing into the system falls below a predetermined pressure.

The system also includes means for supplying a cleaning solution to the stream flowing therethrough.

With the foregoing and other objects in view, reference is now made to the following specification and accompanying drawings in which the preferred embodiment of the invention is illustrated.

In the drawings:

Fig. 1 is a schematic view of a water supply system and electrical control circuit therefor constructed in accordance with the invention.

Fig. 2 is a vertical sectional view through the diaphragm by-pass valve.

Fig. 3 is a vertical sectional view through the low pressure cut-off valve.

Fig. 4 is a view of one of the pressure switches shown partially in section.

Fig. 5 is a sectional view through the flow control valve.

Fig. 6 is a sectional view through the three-way valve.

Fig. 7 is a view in elevation of the selector valve.

Referring to the drawings by characters of reference, the system includes means for controlling the flow of water to a heater for producing hot water at a predetermined temperature and pressure or steam at a predetermined temperature and pressure. The conversion of the system to supply hot water or steam is effected by movement of a three-way valve between predetermined positions to provide the desired predetermined pressure and by manipulation of a control valve for projecting a continuous stream from the spray nozzle in the form of hot water or in the form of steam. The system also includes electrical operating means for controlling a motor driven pump for forcing the water through the system and through coils in the heater for heating the same by means of a projected flame jet therein and for supplying the pressure at which the water or steam is discharged through the nozzle. The electrical operating means also functions to discontinue the operation of the pump in the event that the water flowing into the system falls below a predetermined quantity and the said means also functions to discontinue the flow of the fuel oil in the event of a failure in the system.

As illustrated, the system includes a supply pipe 10 connected with a source of water supply (not shown), and connected with the inlet of a motor driven pump 11. The motor 12 of said pump is interposed in an electrical circuit indicated generally by the reference character 13. Arranged in said supply line is a water reducing valve 14, check valve 15, vacuum breaker 16, and a low water control means 17 having a switch 18 arranged in said circuit for breaking the circuit to the motor in the event that the water in the supply line 10 falls below a predetermined flow.

The system also includes a pipe line 20 connected with the outlet of the pump and which leads to coils 21 arranged in a boiler 22 for circulation of the water delivered by the pump downwardly through the coils. The stream of water passing through the coils 21 is heated by means of a downwardly projecting flame jet issuing from a burner 23 arranged in the boiler adjacent the top thereof. Fuel oil is fed to the burner through an inlet pipe 24 and which is ignited by spaced electrodes 25 connected with the high voltage side of a step-up transformer 26. The transformer 26 is connected by conductor wires 27 and 28 with the conductor wires 29 and 30 which lead to the motor 12 of the motor driven pump 11.

A pipe line 32 branches from the pipe line 20 adjacent the outlet of the pump 11 and connects with the pipe line 20 adjacent the inlet of the boiler 22 by a cross-fitting 33 so as to provide for a partial flow of the water through each of said pipe lines. Connected in the pipe line 32 is a three-way valve 34 which is arranged for directing a portion of the flow from the pipe line 20 through either one or the other of by-pass pipe lines 35 and 36 connected to the supply line 10 adjacent the inlet of the pump 11 by a common pipe connection 37. Arranged in the by-pass lines 35 and 36 are control means 39 and 40 respectively. The control means 40 is set to maintain a predetermined flow of the water from the pump 11 to the boiler 22 when the three-way valve 34 is set to open the outlet for the flow of water through the by-pass line 36 and to close off the flow through the by-pass line 35 and the control means 39 is set to maintain a different predetermined flow of the water to the boiler 22 when the three-way valve 34 is set to close off the flow to the by-pass line 36 and to open the outlet to the by-pass line 35.

The system for instance, may be arranged for supplying a flow of 275 gallons per hour at 150 pounds' pressure per square inch for the discharge of hot water and a flow of 150 gallons per hour at a pressure of 90 pounds per square inch for the discharge of steam. In order to provide for the aforesaid pressures, two pressure responsive switches 42 and 43 are provided which are arranged in parallel and connected in circuit by the conductor wire 29. The pressure switches may be of the diaphragm type and are connected with a pipe line 45 branching from the outlet 46 of the boiler 22 by means of a cross-fitting 47. The pressure switch 42 is set to cut-out or break the circuit when the pressure in the branch line 45 exceeds 90 pounds per square inch and the pressure switch 43 is set to cut-out or break the circuit when the pressure in the branch line 45 exceeds 150 pounds per square inch. The pump 11 is a positive displacement pump for delivering a constant quantity of water which would be somewhat in excess of 275 gallons per hour for the aforesaid arrangement. The conductor wire 29 is provided with a switch 48 which is open when the pressure is to be maintained at 90 pounds per square inch and this switch is manually closed to connect the pressure switch 43 in circuit when a pressure of 150 pounds per square inch is desired in the system. Check valves 49 and 50 are arranged in the pipe lines 20 and 32 for preventing the back flow of the water towards the pump and adjacent the check valve 49, the pipe line 20 is provided with a constant flow fitting 51 which maintains a predetermined quantity of flow of the water therethrough irrespective of the pressure in the flow created by the pump.

For the aforesaid arrangement, the constant flow fitting is set for maintaining a quantity of flow of 150 gallons of water per hour which will be maintained in the portion of the pipe line 20 between the points where the line 32 branches and connects therewith. The remainder of the flow from the pump will be diverted through the three-way valve 34 and when this valve is opened to direct the flow through the by-pass line 36 the control means 40 in accordance with its predetermined setting will by-pass to the supply line 10 the flow in excess of 275 gallons per hour whereby 125 gallons per hour will pass through the branch line 32 which with the flow through the pipe line 20 will produce a delivery of 275 gallons per hour to the boiler 22. When the three-way valve 34 is set to close off the flow through the by-pass line 36, the control means 39 in accordance with its predetermined setting will by-pass to the supply line 10 the flow in excess of 150 gallons per hour, whereby the flow of 150 gallons of water per hour through the pipe line 20 will be supplied to the boiler 22. It is to be understood that when the three-way valve 34 is set to provide for a flow of 275 gallons of water per hour to the boiler, the switch 48 will be closed to place the pressure switch 43 in operation to effect a pressure of 150 pounds per square inch and when the three-way valve 34 is set to provide for a flow of 150 gallons per hour to the boiler 22, the switch 48 is opened whereby the pressure responsive switch 42 maintains a pressure of 90 pounds per square inch.

The outlet 46 from the boiler 22 is connected by a pipe line 54 with a nozzle or gun 55 for discharging a continuous stream of water or steam through the nozzle. The nozzle or gun 55 is connected with the pipe line 54 by a flexible pipe section 56 to permit of the convenient manipulation of the nozzle or gun. The nozzle or gun is provided with a shut-off valve 57 and a selector valve 58 which may be set for the discharge of water or for the discharge of steam when the three-way valve 34 and the switch 48 have been set for a flow of 150 gallons per hour at 90 pounds' pressure per square inch.

In order to inject a cleaning solution in the water supply passing through the supply line 10 in advance of the pump 11, a branch line 60 is provided which connects with the branch line 45 and with the top of a tank 61 adapted for receiving a cleaning solution. The tank 61 is connected with the supply line 10 by means of a branch line 62 having a metering valve 63 therein for regulating the flow of the cleaning solution through the branch line 62. The branch line 60 leading to the tank is provided with a shut-off valve 64 when the supply water is to be delivered to the pump without the cleaning solution.

A fuse 66 and a starting switch 67 are connected in series by the conductor wire 30 in advance of the switch 18 and the low water control means 17. The closing of the switch 67 effects the closing of the electrical circuit 13 and starts the motor 12 if the pressure in the supply line 10 is higher than the setting of the low water control means 17. With the starting of the motor, the pump 11 will produce a flow of the water through the system to the boiler 22 and by manipulation of the three-way valve 34 and the switch 48, 275 gallons per hour of hot or cold water may be provided at 150 pounds' pressure per square inch, or a flow of 150 gallons of water per hour at 90 pounds' pressure per square inch may be provided for supplying steam.

The low water control means may be of the pressure type as illustrated in Fig. 3 of the drawings and which is connected with the supply line 10 by a short pipe section 69 to admit the pressure of the water against the under side of a flexible diaphragm 70. The pressure of the water against the diaphragm 70 is transmitted to a lever 71 pivoted to the valve casing by a pivot 72 and which lever is tensioned against upward movement by means of a spring 73 surrounding the stem 74 which stem is pivotally connected to the lever 71 as at 75 at one side of the pivot 72. The contact points 76 and 77 of the switch 18 are in contact as illustrated when the pressure of the water against the under side of the diaphragm 70 is above a predetermined minimum. When the pressure falls below a predetermined minimum the contacts 76 and 77 will be separated to break the circuit with the motor.

The control means 39 and 40 are of similar construction and may be of the pressure operated diaphragm type as illustrated in Fig. 2 of the drawings. As illustrated, each of the control means 39 and 40 includes an inlet 80 and an outlet 81, the inlet 80 admitting the pressure of the water to the under side of a flexible diaphragm 82 which is tensioned by a spring 83 interposed between the upper face of the diaphragm and an adjusting screw 84. The diaphragm 82 has a valve 85 affixed thereto which is arranged to engage a seat 86 for shutting off the flow of the water from the inlet 80 to the outlet 81. When the pressure of the water against the under side of the diaphragm 82 exceeds the pressure set on the spring 83, the valve 85 will be opened to by-pass the excess flow through the outlet 81 and thence to the supply line 10 as hereinbefore described.

The pressure switches 42 and 43 are also of similar construction and differ only in the setting of the spring at which the cut-out takes place. As illustrated in Fig. 4 of the drawings, the pressure switch 42 is connected with the branch line 45 by a short pipe section 89 for admitting water pressure to the under side of a flexible diaphragm 90 through a reduced opening 91. A plunger 92 is mounted on the upper side of the diaphragm 90 and engages a lever 93 which is pivoted to the casing at 94 and tensioned by a spring 95 surrounding an adjusting screw 96. The lever 93 is in engagement with a rock lever 97 pivoted as at 98 and which carries a movable contact 99 adapted to engage a fixed contact 100 for making and breaking the circuit through the conductor 29 which will take place in accordance with the setting of the tension on the spring 95.

The three-way valve 34 is illustrated in section in Fig. 6 of the drawings and this valve is of standard construction having a valve element 101 for diverting the flow from the inlet 102 through the outlet 103 connected with the by-pass line 35, or through the outlet 104.

The constant flow fitting 51 as illustrated in section in Fig. 5 of the drawings consists of a fitting composed of threadedly connected parts 106 and 107, the part 106 having a threaded shank 108 and the part 107 having an interiorly threaded opening 109. Between the said parts a flexible rubber disk-like member 110 is secured in position with the opening 111 in alignment with the passageway through the fitting. The opening 111 is of tapered formation enlarging in the direction of the flow of the water therethrough and the said member is free to flex in the direction of flow with the pressure so as to vary the size of the opening 111 and maintain a constant predetermined quantity of flow irrespective of the pressure in the flow created by the pump, as hereinbefore described.

The selector valve 58 is a gate valve as illustrated in Fig. 7 of the drawings in which the gate 113 is provided with an opening 114 to permit the flow of the water therethrough when the gate is closed. The opening 114 is smaller than the outlet orifice in the nozzle or gun 55 to provide additional restriction for the flow of the water whereby the water will be turned to steam when the three-way valve 34 is set to provide for a flow of 150 gallons per hour at 90 pounds' pressure per square inch and the gate valve is in closed relation.

The low water control means 17, the control means 39 and 40, the pressure switches 42 and 43, the three-way valve 34 and the constant flow fitting 51 are all of standard construction and function in the manner described herein.

The electrical circuit 13 also includes conductor wires 116 and 117 branching from the conductor wires 29 and 30 respectively which include a time switch 118 shunted across the conductor wires 116 and 117 and having a switch 119 in circuit with a solenoid valve 120, the valve of which controls the flow of the fuel oil through the pipe 24 to the burner 23. A push button 121 and a heat sensitive switch 122 are arranged in parallel and connected on one side with the conductor wire 117 and on the other side by a conductor wire 123 connected with the conductor wire 124 between the switch 119 and the solenoid valve 120. A pilot light 125 is connected across the conductor wires 116 and 117 and in parallel with the time switch 118 and a manually operated switch 126 is interposed in the conductor wire 117 adjacent the juncture thereof with the conductor wire 30. The heat sensitive switch 122 is located at the top of the boiler 22 for receiving thereon the reflected heat within the boiler and the arrangement is such that when the switch 126 is closed the solenoid of the solenoid valve 120 is energized so as to open the valve for the flow of fuel oil to the burner through the pipe line 24. In the event that the fuel oil is ignited within a predetermined time, the heat sensitive switch 122 will close and the solenoid of the solenoid valve 120 will remain energized even though the time switch 118 opens after the predetermined time set thereon. In the event that the fuel oil is not ignited at the burner 23, the heat sensitive switch 122 will remain open. The time switch 118 will then open after the predetermined time set thereon and the solenoid of the solenoid valve 120 will operate to shut off the flow of the fuel oil to the burner. When this takes place the system can then be recycled only by manually pushing the reset button on the push button 121. A heat sensitive switch 128 is arranged in the pipe line 54 adjacent the boiler 22 and which is in series with the solenoid of the solenoid valve 120 by conductor wires 129 and 130, the former being connected to one side of the solenoid valve and the latter being connected to the conductor wire 116. The heat sensitive switch 128 is normally closed and is set to open at a predetermined temperature to prevent overheating of the boiler 22. The cross-fittings 33 and 47 have blow-out lines 131 and 132 connected thereto respectively which are closed by valves and are adapted to be opened for cleaning out the pipe lines in the system. In order to start the operation of the system, the controls are set as desired and the switch 67 is closed so as to start the motor 12 and pump 11 to thereby force the water through the system. The switch 126 is then closed so as to energize the solenoid valve 120 and open the valve for the flow of fluid to the burner after which the fuel oil will be ignited as hereinbefore described. In the event that only cold water is required, the switch 126 is opened.

What is claimed is:

1. In a water supply system for cleaning machines for discharging either hot water or steam and for maintaining a predetermined quantity of flow of water when hot water is to be discharged and a predetermined flow of water when steam is to be discharged, a water heater having a burner for heating the water therein, a piping system including a supply pipe line and a discharge pipe line connected with the inlet and outlet of the heater, said supply line being adapted to be connected with a source of water supply, a constant delivery pump connected in said water supply line for supplying a constant quantity of flow in excess of that required for delivery by the system, a branch pipe line connected at its ends with said water supply line on the outlet side of the pump, a three-way valve arranged in said branch line, two by-pass lines connected with separate outlets of the three-way valve respectively and connected with the water supply line on the inlet side of the pump for diverting through said by-pass lines respectively a portion of the flow from the pump, a control means arranged in each of said by-pass lines for controlling through one of said by-pass lines the quantity of flow in excess of the predetermined quantity required to be delivered to the heater for the discharge of hot water and for controlling through the other by-pass line the quantity of flow in excess of the predetermined quantity required to be delivered to the heater for discharge of steam, and said three-way valve being adapted to be set for diverting the flow to said by-pass lines respectively.

2. In a water supply system for cleaning machines for discharging either hot water or steam and for maintaining a predetermined quantity of flow of water when hot water is to be discharged and a predetermined flow of water when steam is to be discharged, a water heater having a burner for heating the water therein, a piping system including a supply pipe line and a discharge pipe line connected with the inlet and outlet of the heater, said supply line being adapted to be connected with a source of water supply, a constant delivery pump connected in said water supply line for supplying a constant quantity of flow in excess of that required for delivery by the system, a branch pipe line connected at its ends with said water supply line on the outlet side of the pump, a constant flow fitting arranged in said water supply line intermediate the connections of the branch pipe line with said water supply line for maintaining a constant predetermined quantity of flow through said water supply line on the outlet side of the pump irrespective of the pressure in the flow created by the pump, a three-way valve arranged in said branch line, two by-pass lines connected with separate outlets of the three-way valve respectively and connected with the water supply line on the inlet side of the pump for diverting through said by-pass lines respectively a portion of the flow from the pump, a control means arranged in each of said by-pass lines for controlling through one of said by-pass lines the quantity of flow in excess of the predetermined quantity required to be delivered to the heater for the discharge of hot water and for controlling through the other by-pass line the quantity of flow in excess of the predetermined quantity required to be delivered to the heater for discharge of steam, and said three-way valve being adapted to be set for deverting the flow to said by-pass lines respectively.

3. In a water supply system for cleaning machines for discharging either hot water or steam and for maintaining a predetermined quantity of flow of water when hot water is to be discharged and a predetermined flow of water when steam is to be discharged, a water heater having a burner for heating the water therein, a piping system including a supply pipe line and a discharge pipe line connected with the inlet and outlet of the heater, said supply line being adapted to be connected with a source of water supply, a constant delivery pump connected in said water supply line for supplying a constant quantity of flow in excess of that required for delivery by the system, a branch pipe line connected at its ends with said water supply line on the outlet side of the pump, a three-way valve arranged in said branch line, two by-pass lines connected with separate outlets of the three-way valve respectively and connected with the water supply line on the inlet side of the pump for diverting through said by-pass lines respectively a portion of the flow from the pump, a control means arranged in each of said by-pass lines for controlling through one of said by-pass lines the quantity of flow in excess of the predetermined quantity required to be delivered to the heater for the discharge of hot water and for controlling through the other by-pass line the quantity of flow in excess of the predetermined quantity required to be delivered to the heater for discharge of steam, said three-way valve being adapted to be set for diverting the flow to said by-pass lines respectively, a low water control means connected with the supply pipe line on the inlet side of the pump and having an electric switch, the motor of the motor driven pump and said switch being arranged in an electric circuit adapted to be connected with a source of current supply, and said low water control means functioning to actuate the switch to break the circuit with the motor and discontinue operation of the pump when the water in the supply pipe line on the inlet side of the pump falls below a predetermined quantity of flow.

4. In a water supply system for cleaning machines for discharging either hot water or steam and for maintaining a predetermined quantity of flow of water when hot water is to be discharged and a predetermined flow of water when steam is to be discharged, a water heater having a burner for heating the water therein, a piping system including a supply pipe line and a discharge pipe line connected with the inlet and outlet of the heater, said supply line being adapted to be connected with a source of water supply, a constant delivery pump connected in said water supply line for supplying a constant quantity of flow in excess of that required for delivery by the system, a branch pipe line connected at its ends with said water supply line on the outlet side of the pump, a three-way valve arranged in said branch line, two by-pass lines connected with separate outlets of the three-way valve respectively and connected with the water supply line on the inlet side of the pump for diverting through said by-pass lines respectively a portion of the flow from the pump, a control means arranged in each of said by-pass lines for controlling through one of said by-pass lines the quantity of flow in excess of the predetermined quantity required to be delivered to the heater for the discharge of hot water and for controlling through the other by-pass line the quantity of flow in excess of the predetermined quantity required to be delivered to the heater for discharge of steam, said three-way valve being adapted to be set for diverting the flow to said by-pass lines respectively, a low water control means connected with the supply pipe line on the inlet side of the pump and having an electric switch, a liquid fuel supply line connected with said burner, a solenoid actuated valve arranged in the fuel line and in open relation when solenoid is energized, said solenoid and said switch being arranged in an electric circuit adapted to be connected with a source of current supply, and said low water control means functioning to actuate the switch to break the circuit with the solenoid when the water on the inlet side of the pump falls below a predetermined quantity of flow to thereby release the valve of the solenoid for automatically closing the fuel line to the burner.

5. In a water supply system for cleaning machines for discharging either hot or cold water and for maintaining a predetermined quantity of flow of water when hot water is to be discharged and a predetermined flow of water when steam is to be discharged, a water heater having a burner for heating the water therein, a piping system including a supply pipe line and a discharge pipe line connected with the inlet and outlet of the heater, said supply line being adapted to be connected with a source of water supply, a constant delivery electric motor driven pump connected in said water supply line for supplying a constant quantity of flow in excess of that required for delivery by the system, a branch pipe line connected at its ends with said water supply line on the outlet side of the pump, a three-way valve arranged in said branch line, two by-pass lines connected with separate outlets of the three-way valve respectively and connected with the water supply line on the inlet side of the pump for diverting through said by-pass lines respectively a portion of the flow from the pump, a control means arranged in each of said by-pass lines for controlling through one of said by-pass lines the quantity of flow in excess of the predetermined quantity required to be delivered to the heater for the discharge of hot water and for controlling through the other by-pass line the quantity of flow in excess of the predetermined quantity required to be delivered to the heater for discharge of steam, said three-way valve being adapted to be set for diverting the flow to said by-pass lines respectively, two pressure responsive means connected with the discharge pipe line and each having an electric switch, one of said pressure responsive means being arranged to actuate its switch at a predetermined pressure and the other being arranged to actuate its switch at a predetermined higher pressure, said motor of the motor driven pump and said switches being arranged in an electric circuit, and said pressure responsive means functioning to actuate the switches to break the circuit with the motor to thereby discontinue operation of the pump when the pressure in the discharge pipe line exceeds said predetermined pressures at which said pressure responsive means operate respectively.

References Cited in the file of this patent

UNITED STATES PATENTS

| | | |
|---|---|---|
| 2,134,550 | Eaton | Oct. 25, 1938 |
| 2,289,674 | Ofeldt | July 14, 1942 |